Patented Jan. 3, 1950

2,492,986

UNITED STATES PATENT OFFICE 2,492,986

COMPOSITION FOR PRODUCING CARBON DIOXIDE FROM HYDROGEN AND CARBON CONTAINING COMPOUNDS, AND THE PROCESS FOR PRODUCING THE SAME

Clifford Hach, Clifton, N. J., assignor to Kidde Manufacturing Co., Inc., Bloomfield, N. J., a corporation of Delaware No Drawing. Application January 4, 1946, Serial No. 639,145

3 Claims. (Cl. 252—186)

This invention relates to a product composed of a mixture of oxidizing material, catalytic material and binding material and to a process of preparing the product.

An object of the present invention is to provide an improved porous product composed of oxidizing and catalytic materials.

Another object is to provide a product of the foregoing character particularly adapted for use in a process for directly producing high yields of substantially pure carbon dioxide from hydrogen and carbon containing compounds.

Another object is to provide a product of the foregoing character adapted to be prepared in a simple, inexpensive manner from materials readily available at a low cost.

Another object is to provide a product of the foregoing character which readily gives up its oxygen and is readily regenerated or reactivated.

Another object is to provide a product of the foregoing character which may be used over again a great number of times.

Another object is to provide a product of the foregoing character which is heat resistant, and will not melt or shrink on heating to the melting point of copper and slightly above.

A further object is to provide an improved method of preparing a product of the foregoing character.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, it has been found that the foregoing objects may be accomplished by a product comprising a mixture of copper oxide, aluminum oxide and iron oxide, wherein the copper oxide serves as the oxidizing material in the preparation of carbon dioxide from hydrogen and carbon containing compounds, the iron oxide serves as a catalytic material, and the aluminum oxide serves both as a catalytic and binding material. The improved process provides for the preparation of the product in the form of porous particles of substantially uniform size having a maximum effective surface area adapted to be contacted by hydrogen and carbon containing compounds to catalytically oxidize the compounds to produce carbon dioxide. Also, by reason of such surface area the reacting material is readily regenerated when contacted by an oxygen containing gas.

The materials preferred in preparing the product in accordance with the present invention are powdered cupric oxide, CuO; Alundum cement, a refractive material which consists essentially of fused aluminum oxide, $Al_2O_3$; and ferric oxide, $Fe_2O_3$.

The product in accordance with the invention comprises essentially:

Cupric oxide, approximately 45 to 50 parts by weight
Alundum cement, approximately 45 to 50 parts by weight
Ferric oxide, approximately 2 to 10 parts by weight It will be understood that the proportions of the foregoing materials may be varied to some extent within the above limits without sacrificing the advantages of the present invention.

The process of preparing the product of the present invention is illustrated by the following example:

*Example*

Fifty parts by weight of powdered cupric oxide, forty-five parts by weight of powdered Alundum cement, and five parts by weight of ferric oxide were mixed in dry form. Sufficient water was added to the mixture of powdered oxides to make a stiff paste and this paste was worked to reduce agglomerates and to insure uniform wetting of the powder particles to provide a substantially homogeneous mass.

The paste was then extruded through a 12 mesh screen to produce spaghetti-like formations of substantially uniform diameter and these formations were dried at a temperature of about 100° C. to drive off the water. The dried mass was then transferred to a crucible, and was fired at a temperature of about 1000° C. for a period of between about one-half and one hour, whereby the material was sintered to produce a substantially porous mass.

After sintering, the mass of porous material was disintegrated by crushing the same to produce porous particles of a substantially uniform predetermined size adapted to pass through a quarter inch mesh screen. The fines were removed with a 20 mesh screen.

The porous product prepared by the foregoing process was used in directly producing carbon dioxide by the catalytical oxidation of hydrogen and carbon containing compounds. The carbon dioxide produced was substantially pure and high yields of carbon dioxide were obtained. The cupric oxide gave up its oxygen in a desired manner and after being reduced to a predetermined degree could be readily reactivated by passing air thereover. The catalytic material, aluminum and ferric oxides, did not appear to become poisoned during the reaction cycle and appeared to be in its initial state after reactivation of the mixture. The physical characteristics of the mixture did not change materially. Also, the mixture did not disintegrate and appeared to be heat resistant. The copper oxide, copper or partly reduced copper oxide did not form molten agglomerations at temperatures slightly higher than the melting point of copper and copper oxide. The product was used over again eighty times before replacement thereof was believed to be advisable.

In place of or in addition to the ferric oxide there may be employed one or more heavy metal oxides of the group consisting of cobalto cobaltic oxide ($Co_3O_4$), manganic oxide ($Mn_2O_3$), and nickel oxide (NiO).

Also, in place of or in addition to the aluminum oxide, there may be employed one or more oxides of the group consisting of silicon oxide ($SiO_2$), magnesium oxide (MgO), and zirconium oxide ($ZrO_2$).

From the foregoing description it will be seen that the present invention provides an improved mixture of oxidizing material and catalytic material and a simple process of preparing the same. By extruding the paste prior to drying and sintering, the size of the particles can be accurately controlled.

The mixture is particularly adapted for use in the direct preparation of carbon dioxide from hydrogen and carbon containing compounds by a process such as described in co-pending application Serial No. 639,143, filed January 4, 1946.

It will be understood that the details and examples hereinbefore set forth are illustrative only and that the invention as broadly described and claimed is in no way intended to be limited thereby.

It is also to be understood that the following claims are intended to cover all the generic and specific features of the invention herein described, and all statements of the scope of the invention which, as a matter of language, might be said to fall therebetween.

I claim:

1. A product adapted for use in a process for directly producing carbon dioxide from hydrogen and carbon containing compounds, said product consisting of about 45 to 50 parts by weight of cupric oxide, about 45 to 50 parts by weight of a material selected from the group consisting of aluminum oxide, magnesium oxide, silicon oxide and zirconium oxide, and about 2 to 10 parts by weight of a material selected from the group consisting of ferric oxide, cobalto cobaltic oxide, manganic oxide and nickel oxide.

2. A product adapted for use in a process for directly producing carbon dioxide from hydrogen and carbon containing compounds, said product consisting of porous particles of substantially uniform size formed of a mixture of about 45 to 50 parts by weight of cupric oxide, about 45 to 50 parts by weight of a material selected from the group consisting of aluminum oxide, magnesium oxide, silicon oxide and zirconium oxide, and about 2 to 10 parts by weight of a material selected from the group consisting of ferric oxide, cobalto cobaltic oxide, manganic oxide and nickel oxide.

3. The method of preparing a product of the class described, comprising mixing about 45 to 50 parts by weight of cupric oxide between, about 45 and 50 parts by weight of a material selected from the group consisting of aluminum oxide, magnesium oxide, silicon oxide and zirconium oxide, about 2 to 10 parts by weight of a material selected from the group consisting of ferric oxide, cobalto cobaltic oxide, manganic oxide and nickel oxide, and sufficient water to form a stiff paste, extruding the paste through a screen to form spaghetti-like formations of a predetermined diameter, sintering the paste formations at a temperature of about 1000° C. for a period of between about one-half to about one hour to form a hard rigid material which is porous, and disintegrating the material to form particles of the product having a predetermined size.

CLIFFORD HACH.

REFERENCES CITED

The following references are of record in the file of this patent:

UNITED STATES PATENTS

| Number | Name | Date |
|---|---|---|
| 1,939,708 | Larson | Dec. 19, 1933 |
| 1,970,695 | Freyermuth | Aug. 21, 1934 |
| 2,010,427 | Eversole | Aug. 6, 1935 |
| 2,106,597 | Ferguson | Jan. 25, 1938 |
| 2,143,367 | Balz et al. | Jan. 10, 1939 |
| 2,180,672 | Frey | Nov. 21, 1939 |
| 2,242,627 | Strickland | May 20, 1941 |

OTHER REFERENCES

Mellor: Comprehensive Treatise on Inorganic and Theoretical Chemistry, vol. 3, page 137 (1928).